US008207977B1

(12) United States Patent
Kumar et al.

(10) Patent No.: US 8,207,977 B1
(45) **Date of Patent: *Jun. 26, 2012**

(54) SYSTEM, METHOD, AND COMPUTER PROGRAM PRODUCT FOR CHANGING A REFRESH RATE BASED ON AN IDENTIFIED HARDWARE ASPECT OF A DISPLAY SYSTEM

(75) Inventors: Ratin Kumar, Santa Clara, CA (US); Lieven P. Leroy, South San Francisco, CA (US); Charles T. Inman, Redwood City, CA (US); Jacques Ge Mahe, Los Altos, CA (US); Bruno E. A. Martin, Campbell, CA (US); James Reed Walker, Santa Clara, CA (US); Manish Lohani, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 1259 days.

This patent is subject to a terminal disclaimer.

(21) Appl. No.: 11/867,418

(22) Filed: Oct. 4, 2007

(51) Int. Cl.
*G06F 13/14* (2006.01)
*G06F 15/00* (2006.01)
*G06T 1/00* (2006.01)

(52) U.S. Cl. ........................................ 345/519; 345/501

(58) Field of Classification Search ........................ None
See application file for complete search history.

(56) References Cited

U.S. PATENT DOCUMENTS 5,841,430 A 11/1998 Kurikko
6,441,812 B1 8/2002 Voltz ............................ 345/213
6,618,095 B1 9/2003 Takeuchi et al.
6,862,022 B2 3/2005 Slupe ............................ 345/207
7,119,803 B2 10/2006 Stanley et al.
7,177,448 B1 * 2/2007 Sah ............................ 382/107
7,362,295 B2 4/2008 Park et al.
7,499,043 B2 3/2009 Vasqnez et al.
7,586,484 B2 9/2009 Sampsell et al. .............. 345/204
7,898,535 B2 3/2011 Juenger
8,179,388 B2 5/2012 Wyatt et al.
2003/0007070 A1 1/2003 Lipton et al.
2003/0016215 A1 1/2003 Slupe
2003/0222876 A1 * 12/2003 Giemborek et al. .......... 345/503
2004/0252115 A1 12/2004 Boireau ........................ 345/211
2006/0039466 A1 2/2006 Emerson et al.
2006/0077127 A1 4/2006 Sampsell et al.
2006/0085616 A1 4/2006 Zeighami et al.

(Continued)

FOREIGN PATENT DOCUMENTS

EP 1265210 A1 12/2002

(Continued)

OTHER PUBLICATIONS

Office Action Summary from U.S. Appl. No. 11/611,805 mailed on Nov. 2, 2009.

(Continued)

*Primary Examiner* — Jacinta M Crawford
(74) *Attorney, Agent, or Firm* — Zilka-Kotab, PC

(57) ABSTRACT

A system, method, and computer program product are provided for changing a refresh rate of a display system. In use, an aspect of hardware of a display system is identified. To this end, a refresh rate of the display system may be changed based on the identified aspect.

12 Claims, 9 Drawing Sheets

U.S. PATENT DOCUMENTS

| | | | | |
|---|---|---|---|---|
| 2006/0146056 | A1* | 7/2006 | Wyatt | 345/501 |
| 2007/0146294 | A1 | 6/2007 | Nurmi et al. | |
| 2008/0001934 | A1 | 1/2008 | Wyatt | 345/204 |
| 2008/0030615 | A1 | 2/2008 | Vasquez et al. | |
| 2008/0100598 | A1 | 5/2008 | Juenger | 345/204 |
| 2008/0204481 | A1 | 8/2008 | Mostinski | |
| 2008/0309652 | A1* | 12/2008 | Ostlund | 345/211 |

FOREIGN PATENT DOCUMENTS

| | | | |
|---|---|---|---|
| EP | 1640951 | | 3/2006 |
| JP | 11003063 | A | 1/1999 |
| KR | 1020050056796 | A | 6/2005 |
| WO | 03100759 | A1 | 12/2003 |

OTHER PUBLICATIONS

Final Office Action from U.S. Appl. No. 11/610,420, mailed May 7, 2010.

Final Office Action from U.S. Appl. No. 11/611,805, mailed May 27, 2010.

U.S. Appl. No. 11/867,445, filed Oct. 4, 2007.

Office Action Summary from U.S. Appl. No. 11/610,420 mailed Sep. 9, 2009.

U.S. Appl. No. 11/610,420, filed Dec. 13, 2006.

U.S Appl. No. 11/611,805, filed Dec. 15, 2006.

Cho, "Power Management of iPAQ," USC Information Science Institute.

Shah et al., "Enabling great Battery Life: the value and the methods for laptop platforms," Intel Developer Forum.

Non-Final Office Action from U.S. Appl. No. 11/867,445, dated Feb. 16, 2011.

Non-Final Office Action from U.S. Appl. No. 11/610,420, dated Sep. 7, 2010.

First Office Action from Chinese Patent Application No. 2007101953315, dated Jun. 19, 2009.

Second Office Action from Chinese Patent Application No. 2007101953315, dated Dec. 25, 2009.

Third Office Action from Chinese Patent Application No. 2007101953315, dated Sep. 30, 2010.

Notice of Preliminary Rejection from Korean Patent Application No. 10-2007-0128183, dated Feb. 26, 2010.

Notice of Final Rejection from Korean Patent Application No. 10-2007-0128183, dated Aug. 28, 2010.

Notice of Preliminary Rejection from Korean Patent Application No. 10-2007-0128183, dated Nov. 8, 2010.

Notice of Reasons for Rejection from Japanese Patent Application No. 2007-298085, dated Jan. 4, 2011.

Final Office Action from U.S. Appl. No. 11/610,420 dated May 19, 2011.

Advisory Action from U.S. Appl. No. 11/610,420 dated Jul. 28, 2011.

Non-Final Office Action from U.S. Appl. No. 11/611,805 dated Jun. 21, 2011.

Non-Final Office Action from U.S. Appl. No. 11/867,445 dated Aug. 4, 2011.

Notice of Final Rejection from Japanese Patent Application No. 2007-298085 dated Jul. 19, 2011.

Office Action from Chinese Patent Application No. 200710195331.5 dated Jun. 9, 2011.

Decision on Rejection from Chinese Patent Application No. 200710195331.5, dated Dec. 8, 2011.

Non-Final Office Action from U.S. Appl. No. 11/610,420, dated Nov. 22, 2011.

Notice of Allowance from U.S. Appl. No. 11/611,805, dated Jan. 17, 2012.

Final Office Action from U.S. Appl. No. 11/610,420, dated Mar. 8, 2012.

Final Office Action from U.S. Appl. No. 11/867,445, dated Mar. 1, 2012.

Office Action from Taiwan Patent Application No. 096143970, dated Mar. 26, 2012.

* cited by examiner

SYSTEM, METHOD, AND COMPUTER PROGRAM PRODUCT FOR CHANGING A REFRESH RATE BASED ON AN IDENTIFIED HARDWARE ASPECT OF A DISPLAY SYSTEM

FIELD OF THE INVENTION

The present invention relates to display systems, and more particularly to controlling a refresh rate of a display system.

BACKGROUND

A display refresh rate refers to the number of times an image is re-displayed, or "refreshed" on a display in a given amount of time. A refresh rate is typically expressed in hertz (Hz), thus a refresh rate of 75 means the image is refreshed 75 times in a second, and so on. Unfortunately, each time a display must be refreshed, additional power is required. For instance, additional power may be required to fetch data from memory, drive pixels out of an interface, refresh each pixel of the display, etc.

Various systems have been developed for dynamically adjusting a display refresh rate to provide power savings. Such dynamic adjustment may be carried out as a function of various aspects of the display of content (e.g. the content itself, etc.). For instance, the display of a simple word processor application may change very little from frame to frame, whereas a video clip may change dramatically from frame to frame. To this end, various prior art systems have adjusted the refresh rate to a minimum rate needed to accommodate such frame to frame changes. In the example above, the system may, for instance, only need a refresh rate of 40 Hz while using the word processor application, but need a refresh rate of 60 Hz while viewing the video clip.

To date, however, the aforementioned systems have been limited to refresh rate adjustment based on software aspects of the associated system. There is thus a need for addressing these and/or other issues associated with the prior art.

SUMMARY

A system, method, and computer program product are provided for changing a refresh rate of a display system. In use, an aspect of hardware of a display system is identified. To this end, a refresh rate of the display system may be changed based on the identified aspect.

DETAILED DESCRIPTION

Figure 1:
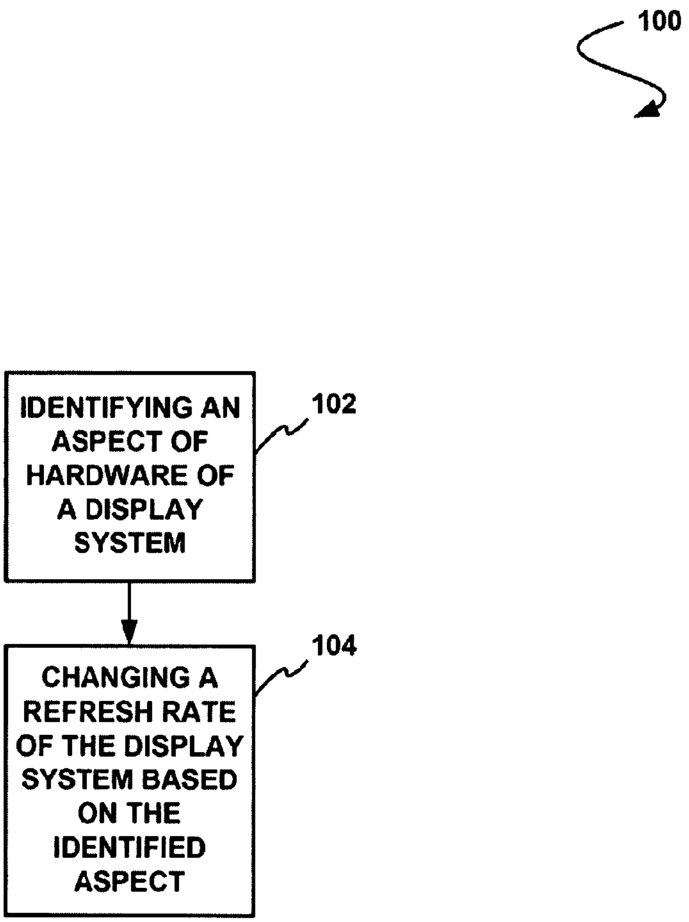
FIG. 1 shows a method for changing a refresh rate of a display system, in accordance with one embodiment.

FIG. 1 shows a method 100 for changing a refresh rate of a display system, in accordance with one embodiment. In various embodiments, the display system may include a liquid crystal display (LCD), digital light processing (DLP) display, liquid crystal on silicon (LCOS) display, plasma display, or any other display capable of refresh rate adjustment, for that matter. Still yet, the refresh rate may refer to the rate at which any sort of refresh of the display system occurs.

As shown, an aspect of hardware of the display system is identified. See operation 102. In the context of the present description, such hardware may include any mechanical, magnetic, electronic, and/or electrical components making up the system. For example, in various embodiments, such hardware may include a central processor, a graphics processor, a network processor, a display, other hardware that exists in association with the display system (or component thereof), etc.

In one embodiment, the aforementioned aspect may include, for example, an indication as to which component of the hardware is being used. In the context of an embodiment involving a graphics processor, such component may include, but is not limited to a video engine, a two-dimensional engine, a three-dimensional engine, a pixel pipeline, and/or any other component, for that matter. Of course, such component may vary based on a type of processor (e.g. central processor, network processor, etc.) that is involved.

In another embodiment, the aspect of the hardware may include an indication as to which capabilities of the hardware are being used. Again, in the context of an embodiment involving a graphics processor, such capabilities may include an anti-aliasing capability, overlay capability, etc.

As an option, operation 102 may not necessarily be limited to an aspect of hardware. For example, an aspect of software associated with the hardware may also be identified. In various embodiments, the aspect of software may include an indication as to which software component is being used. Such software component may include, but is certainly not limited to at least a portion of an application program, a driver, an operating system, etc. In yet another embodiment, the foregoing aspect may include information about visual data before or after it has been drawn.

To this end, a refresh rate of the display system may be changed based on the identified aspect. See operation 104. In one embodiment, the refresh rate of the display system may be changed for each of a plurality of sequential frames of display data (e.g. for each sequential frame, etc.). In other embodiments, the refresh rate of the display system may be changed for each of a plurality of groups of frames of display data. Of course, other embodiments are contemplated where the refresh rate is changed irrespective of the display of frames, etc.

Further, the refresh rate may be changed in any desired manner. Just by way of example, the refresh rate of the display system may be changed by changing an inactive time period. In the context of the present description, such inactive time period may include any time when the display system is not being actively driven. Additional information regarding various examples of inactive time periods will be set forth later in greater detail.

To this end, the refresh rate may be changed to reflect the specifics of the associated hardware. For instance, in some situations, it may make sense to decrease or increase the refresh rate in view of the operation of the hardware (as well as associated software, in some embodiments, etc.). Examples of such situations will be described later in more detail. Strictly as an option, the foregoing technique may be utilized for additional purposes such as reducing a power consumed by the display system, reducing an amount of heat generated by the display system, freeing up bandwidth, etc.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
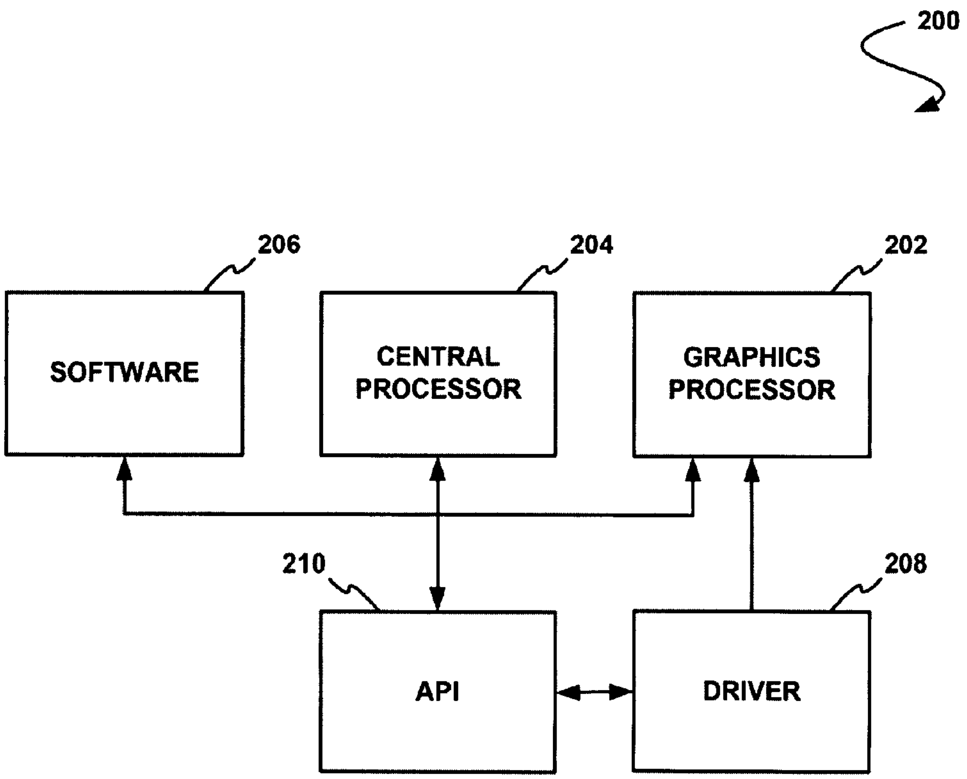
FIG. 2 shows a system for changing a refresh rate of a display system, in accordance with one embodiment.

FIG. 2 shows a system 200 for changing a refresh rate of a display system, in accordance with one embodiment. As an option, the present system 200 may be implemented to carry out the method 100 of FIG. 1. Of course, however, the system 200 may be implemented in any desired environment. It should also be noted that the aforementioned definitions may apply during the present description.

As shown, various hardware is provided including a graphics processor 202 and a central processor 204 that are coupled to a display (not shown). As further shown, software 206 may be provided for execution in conjunction with the aforementioned hardware. Still yet, a driver 208 is provided for interfacing and controlling the graphics processor 202. In use, the driver 208 is capable of controlling a refresh rate at which the graphics processor 202 drives the display, based on any aspect of the graphics processor 202, central processor 204, display, software 206, etc.

To accomplish this, an application program interface (API) 210 may interface the driver 208, as well as the graphics processor 202, central processor 204, display, software 206, etc. By virtue of such configuration, THE API 210 is capable of monitoring the aforementioned hardware and/or software for the purpose of directing the driver 208 to change the refresh rate under certain conditions. As an option, the API 210 may be equipped to interface with the foregoing hardware and/or software components using any number of standard and/or proprietary protocols, so that various aspects thereof may be properly identified.

In one embodiment, the API 210 may define a plurality of profiles that have different associated refresh rates and are each triggered based on different criteria associated with the various hardware/software aspects. Such triggering criteria may include something as simple as whether some component and/or capability is enabled or exists. In other embodiments, the triggering criteria may involve simple or complex logic (e.g. Boolean, etc.), thresholds, etc. that take into account various software/hardware aspects, as parameters.

Table 1 illustrates a number of exemplary profiles that may be used by the API 210. The contents of Table 1 may be stored using any data structure and, in various embodiments, may be user configurable or predefined. Of course, the profiles of Table 1 are set forth for illustrative purposes only and should not be construed as limiting in any manner whatsoever.

TABLE 1

| | | |
|---|---|---|
| profile_1 | refresh_rate_1 | trigger_criteria_1 (aspect_1, aspect_2) |
| profile_2 | refresh_rate_2 | trigger_criteria_2 (aspect_3, aspect_4) |
| profile_3 | refresh_rate_3 | trigger_criteria_3 (aspect_5, aspect_6) |
| profile_4 | refresh_rate_4 | trigger_criteria_4 (aspect_7, aspect_8) |

In one example of use, a situation may be identified where a two-dimensional engine of the graphics processor 202 is being used, while a three-dimensional engine of the graphics processor 202 is not being used. Such situation may exist, for example, when a word processing or presentation application program is running (as opposed to a gaming application, etc.). In such situation, a profile may be selected with a reduced refresh rate. Such reduced refresh rate may be less likely to be noticed by a user, since such programs are more likely to be static in nature.

In another example of use where the three-dimensional engine of the graphics processor 202 is identified as being used (e.g. by a gaming application, etc.), a different profile with a higher refresh rate may be selected to ensure that a sufficient level of display quality is maintained. A similar increase in refresh rate may be required when a video engine is enabled (e.g. for playing a DVD, etc.). By choosing profiles in such manner, various benefits (e.g. power/bandwidth savings, etc.) may be incurred without significant expense in terms of user experience, in situations that permit it.

Figure 3:
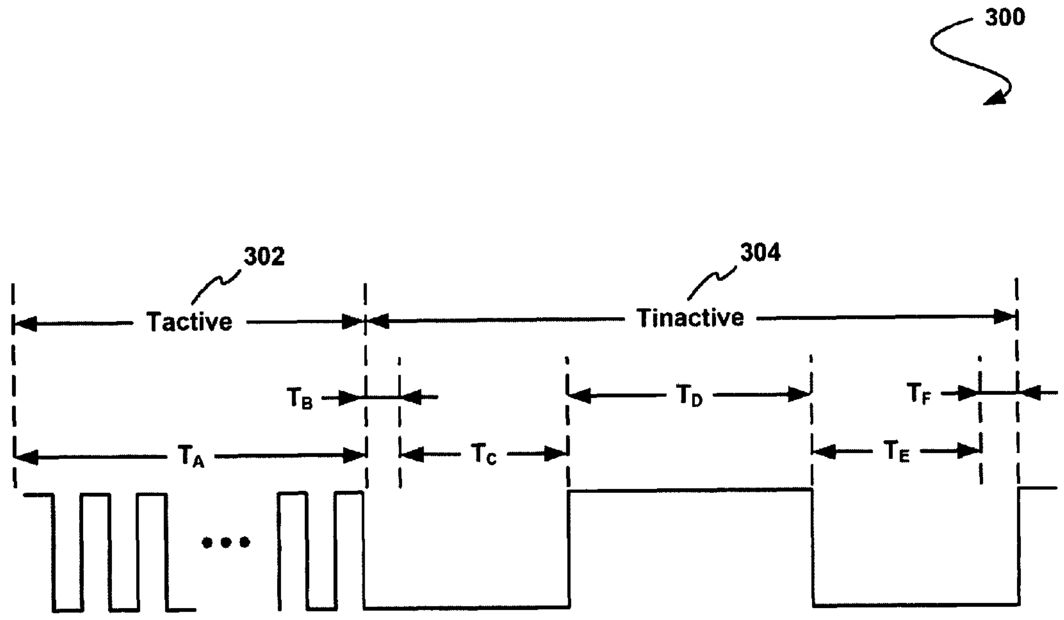
FIG. 3 shows a timing diagram illustrating various parameters that may be controlled for changing a refresh rate, in accordance with another embodiment.

FIG. 3 shows a timing diagram 300 illustrating various parameters that may be controlled for changing a refresh rate, in accordance with another embodiment. As an option, the present timing diagram 300 may reflect various parameters that may be changed in conjunction with the functionality/architecture of FIGS. 1-2. Again, the aforementioned definitions apply during the present description.

As shown, an active time period 302 is provided during which pixels are being rendered. Further, an inactive time period 304 is also provided during which pixels are not rendered. Such inactive time period 304 may include a first border period $T_B$ when a first border (if present) is rendered, a front porch blanking period $T_C$ associated with a front porch, a blanking period $T_D$, a back porch blanking period $T_E$ associated with a back porch, and a second border period $T_F$ when a second border (if present) is rendered.

It should be noted that, depending on whether the first and second border are active or inactive, the associated time periods may be considered part of the active time period 302 or the inactive time period 304, respectively. Still yet, the timing diagram 300 is shown to be generalized so as to apply to both horizontal and vertical timing. For example, when applied to horizontal timing, each pulse shown in FIG. 3 may prompt the rendering of a line on a display. On the other hand, when applied to vertical timing, each pulse shown in FIG. 3 may prompt the rendering of a frame on the display.

In use, the refresh rate of the display be changed by altering one or more components of the inactive time period 304. Specifically, any one or more of the following components may be increased or decreased accordingly: the first border period $T_B$, front porch blanking period $T_C$, blanking period $T_D$, back porch blanking period $T_E$, and second border period $T_F$.

Figure 4:
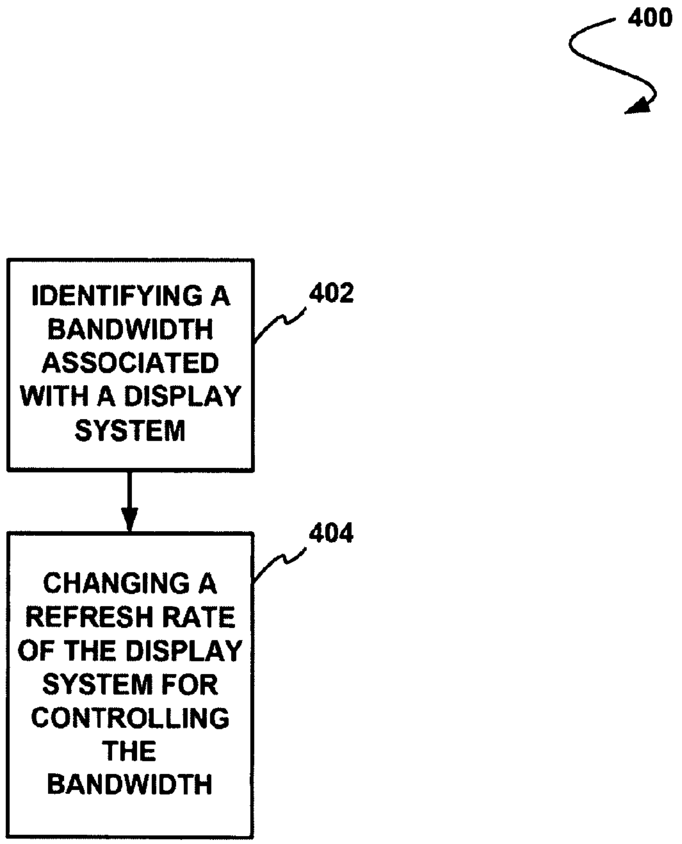
FIG. 4 shows a method for changing a refresh rate of a display system for the specific purpose of managing system bandwidth, in accordance with another embodiment.

FIG. 4 shows a method 400 for changing a refresh rate of a display system for the specific purpose of managing system bandwidth, in accordance with another embodiment. As an option, the present method 400 may or may not be implemented in the context of the functionality and architecture of FIGS. 1-3. Of course, however, the method 400 may be carried out in any desired environment. Yet again, it should also be noted that the aforementioned definitions may apply during the present description.

As shown, a bandwidth associated with a display system is identified. See operation 402. In the context of the present description, the display system may include any component coupled to a display and/or the display itself. Further, the bandwidth may refer to any bandwidth that is capable of being impacted by the use of the foregoing display.

For instance, the bandwidth may be associated with a graphics-subsystem of the display system, a central-subsystem of the display system, etc. In various embodiments, the bandwidth may be associated with communication between a graphics processor of the graphics-subsystem and display memory; communication between the central-subsystem and the graphics-subsystem, and system memory, etc. Examples of such bandwidth will be set forth during the description of FIG. 5.

In use, a refresh rate of the display system may be changed for controlling the bandwidth. Note operation 404. Of course, the refresh rate may be changed using any desired techniques including, but not limited to those discussed hereinabove during the description of FIGS. 1-3. By this feature, the bandwidth available to the display system may be increased or decreased by changing the refresh rate, since the refresh rate itself impacts such bandwidth.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 5:
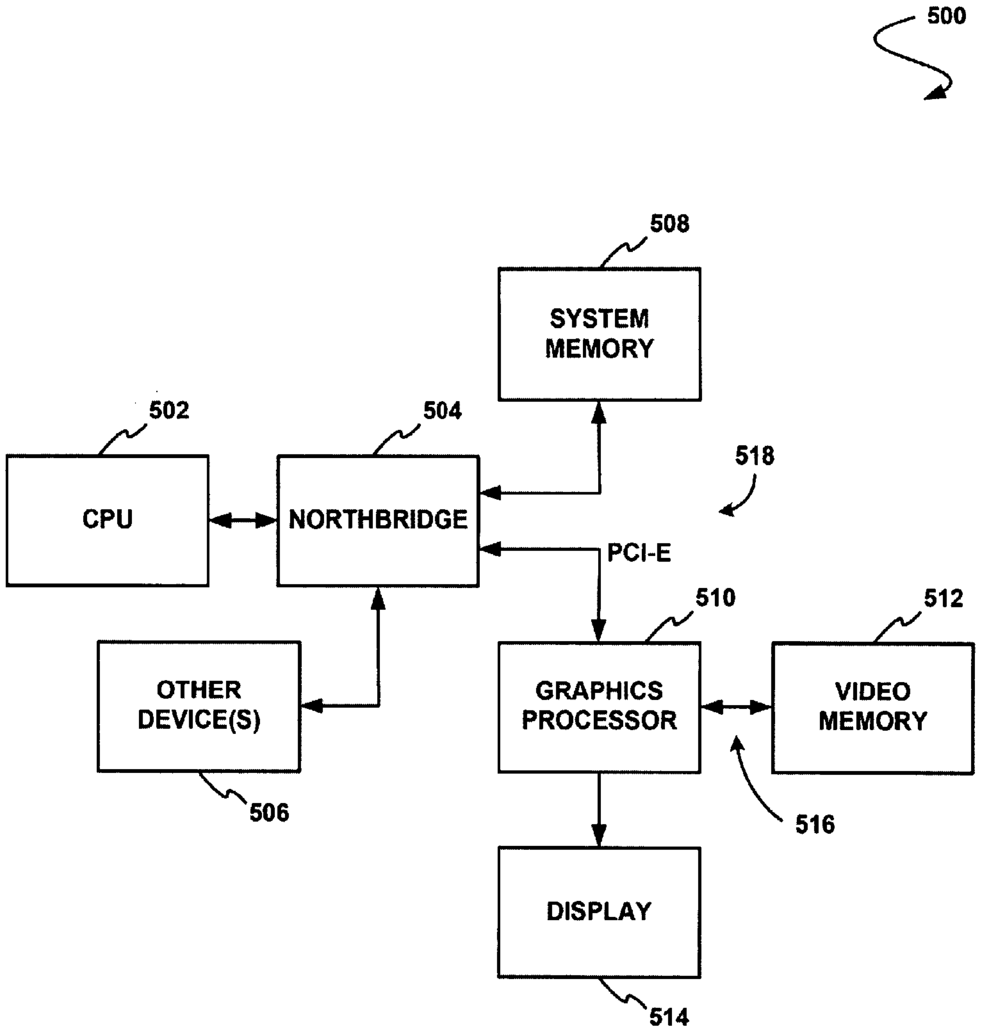
FIG. 5 shows a display system for managing system bandwidth by controlling a display system refresh rate, in accordance with yet another embodiment.

FIG. 5 shows a display system 500 for managing system bandwidth by controlling a display system refresh rate, in accordance with yet another embodiment. As an option, the present system 500 may be employ the functionality set forth during the description of FIGS. 1-4. Of course, however, the system 500 may be implemented in any desired environment. Again, the aforementioned definitions may apply during the present description.

As shown, the display system 500 includes a central-subsystem 502 including a CPU, etc. coupled to a north bridge sub-system 504 which, in turn, is coupled to a plurality of other devices 506. Further coupled to the north bridge subsystem 504 is system memory 508 for providing storage capabilities to the central-subsystem 502, as well as a graphics sub-system 510 including a graphics processor, etc.

As further shown, the graphics sub-system 510 is separately coupled to the north bridge sub-system 504. In one embodiment, such coupling may be made via a PCIe bus. Still yet, video memory 512 is coupled to the graphics sub-system 510 for providing allocated storage capabilities, for use when driving a display 514.

In use, the graphics sub-system 510 may utilize a first bandwidth associated with a connection 516 between the graphics sub-system 510 and the video memory 512. For example, texture information, etc. may be stored and/or received over the foregoing connection 516. Further, the graphics sub-system 510 may also utilize a second bandwidth associated with a connection 518 between the graphics subsystem 510 and the system memory 508 via the north bridge sub-system 504, PCIe bus, etc. For instance, the system memory 508 may serve as a frame buffer or the like for fetching pixels, etc. In use, such second bandwidth may be shared with the central-subsystem 502, the other devices 506, etc.

As mentioned earlier, such first and/or second bandwidth may be controlled by changing a refresh rate with which the graphics sub-system 510 drives the display 514. Specifically, an increase in such refresh rate may result in an increase in the portion of the available first and/or second bandwidth that is used by the graphics sub-system 510/display 514. Similarly, a decrease in such refresh rate may result in a decrease in the portion of the available first and/or second bandwidth that is used by the graphics sub-system 510/display 514. To this end, a portion of the first and/or second bandwidth that is available to other components of the display system 500 may be controlled by changing the refresh rate. More information regarding one way that this may be accomplished will now be set forth.

Figure 6:
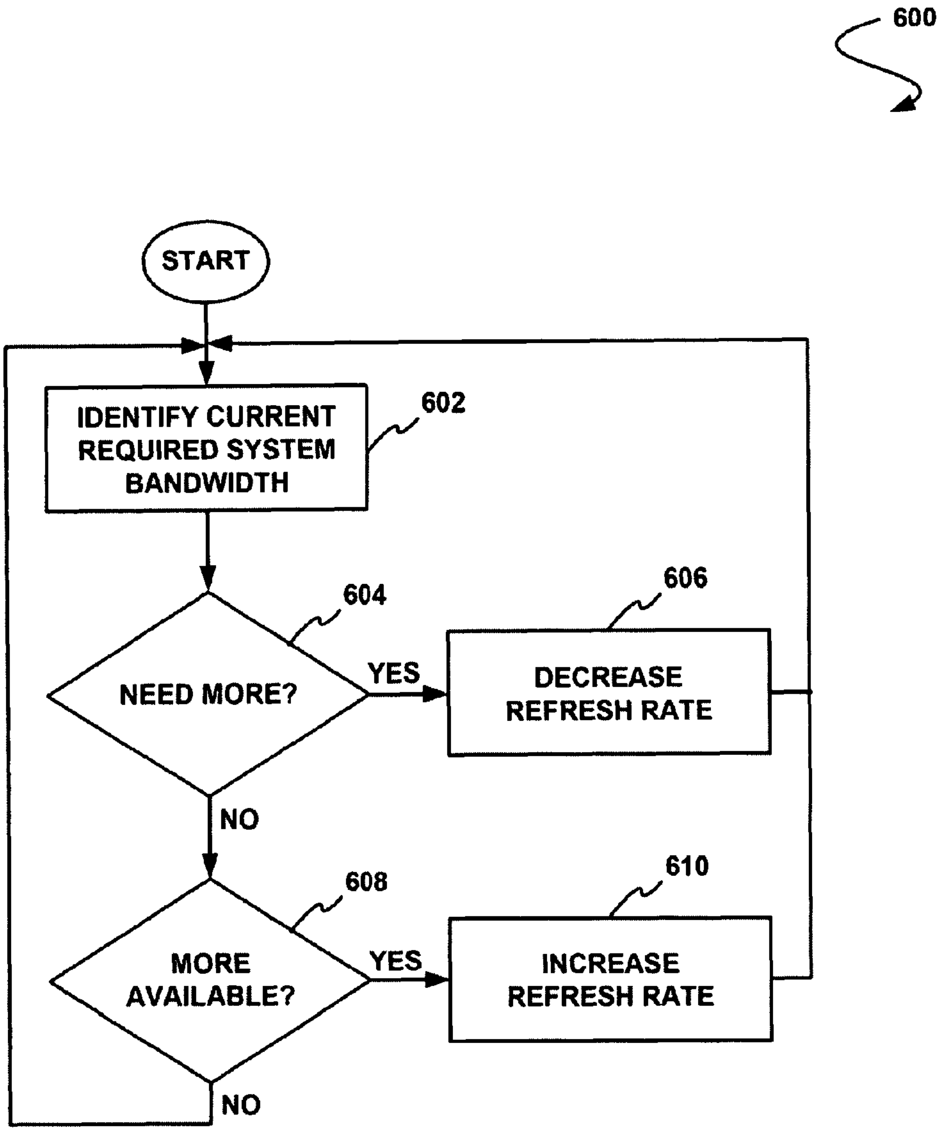
FIG. 6 shows a method for changing a refresh rate of a display system for the specific purpose of managing system bandwidth, in accordance with another embodiment.

FIG. 6 shows a method 600 for changing a refresh rate of a display system for the specific purpose of managing system bandwidth, in accordance with another embodiment. As an option, the present method 600 may or may not be carried out in the context of the functionality and architecture of FIGS. 1-5. Of course, however, the method 600 may be carried out in any desired environment. Yet again, it should also be noted that the aforementioned definitions may apply during the present description.

As shown, a current bandwidth required by a system may be identified. See operation 602. This may be accomplished, for example, by simply monitoring an amount of used bandwidth associated with one or more connections.

It is then determined whether more bandwidth is needed, as indicated in decision 604. Such determination may be made by comparing the bandwidth identified in operation 602 with a predetermined or user-configured threshold. Such threshold may include, for example, a maximum amount of bandwidth that can be accommodated by a given connection(s). For example, if the bandwidth identified in operation 602 comes within a predetermined amount of (or exceeds) the maximum amount, it may be determined that more bandwidth is required.

If it is determined in decision 604 that more bandwidth is required, a refresh rate associated with a display may be decreased. See operation 606. By decreasing such refresh rate, a graphics processor may require less communication with associated memory which, in turn, may free up bandwidth and thus make it available for other system components.

Similar to decision 604, it may be determined whether additional bandwidth is available, as indicated in decision 608. Again, such determination may be made by comparing the bandwidth identified in operation 602 with a predetermined or user-configured threshold. Such threshold may include, for example, a predetermined threshold that indicates that a significant amount of bandwidth is available over a given connection(s). For example, if the bandwidth identified in operation 602 falls below such amount, it may be determined that a surplus of bandwidth exists (which may be made available to the display system, for example). In another embodiment, decision 608 may be omitted in favor of a single decision 604 and associated threshold.

If it is determined in decision 608 that additional bandwidth is available, a refresh rate associated with a display may be increased. See operation 610. By increasing such refresh rate, a graphics processor may require more communication with associated memory, etc. which, in turn, may use the available bandwidth.

It should be noted that, in other embodiments, additional logic may be incorporated with the decisions 604 and 608. For example, while such decisions 604 and 608 may indicate whether additional bandwidth is required or available, the ultimate decision to change the refresh rate may be further dependent on other factors such as various aspects associated with hardware and/or software of the display system (see FIGS. 1-3).

In one embodiment, such hardware/software aspects may indicate that, while bandwidth is required, it can not be allocated away from a graphics sub-system, since it is currently needed. This situation may arise, for example, if a gaming application is currently running that requires a bandwidth-intensive three-dimensional engine of a graphics processor. On other hand, the hardware/software aspects may indicate that, while bandwidth is available, it need not be allocated to the graphics sub-system, since it is not currently needed.

Figure 7:
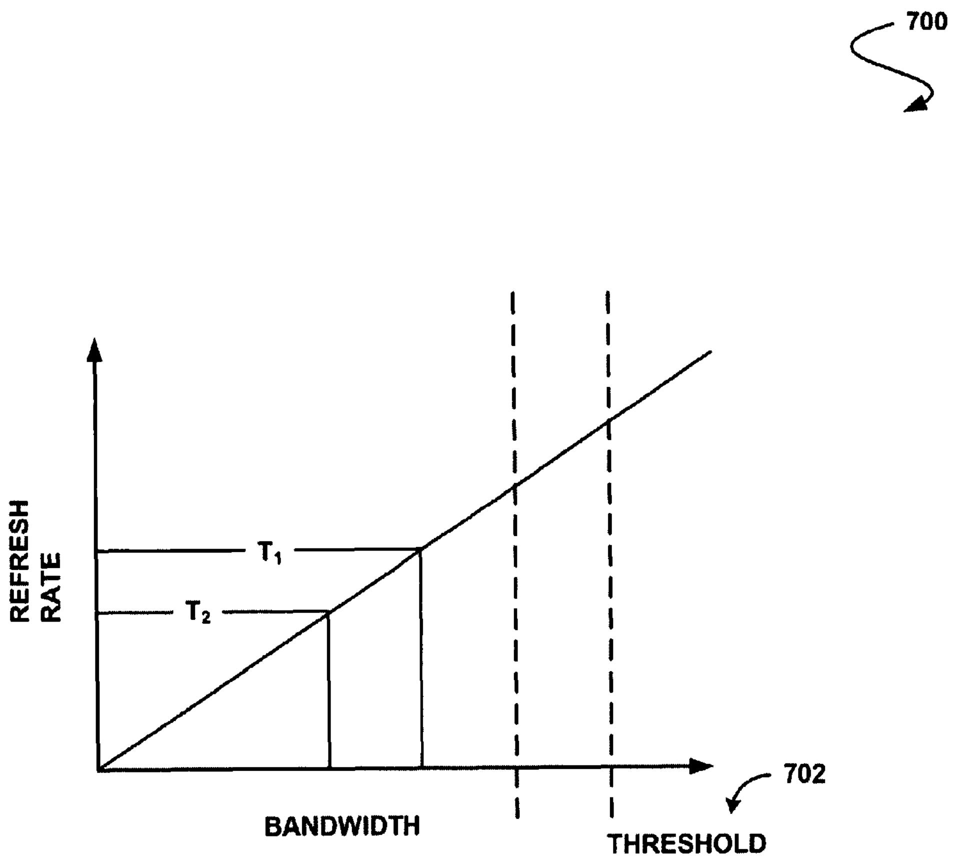
FIG. 7 is a graph showing an exemplary relationship between a refresh rate and a bandwidth, in accordance with one embodiment.

FIG. 7 is a graph 700 showing an exemplary relationship between a refresh rate and a bandwidth, in accordance with one embodiment. As shown, a higher refresh rate T1 is shown to require additional bandwidth, while a lower refresh rate T2 is shown to require less bandwidth. As further shown, one or more various thresholds 702 may indicate a maximum available bandwidth, etc. Thus, a particular refresh rate may be selected based on whether such threshold is met, etc.

Figure 8:
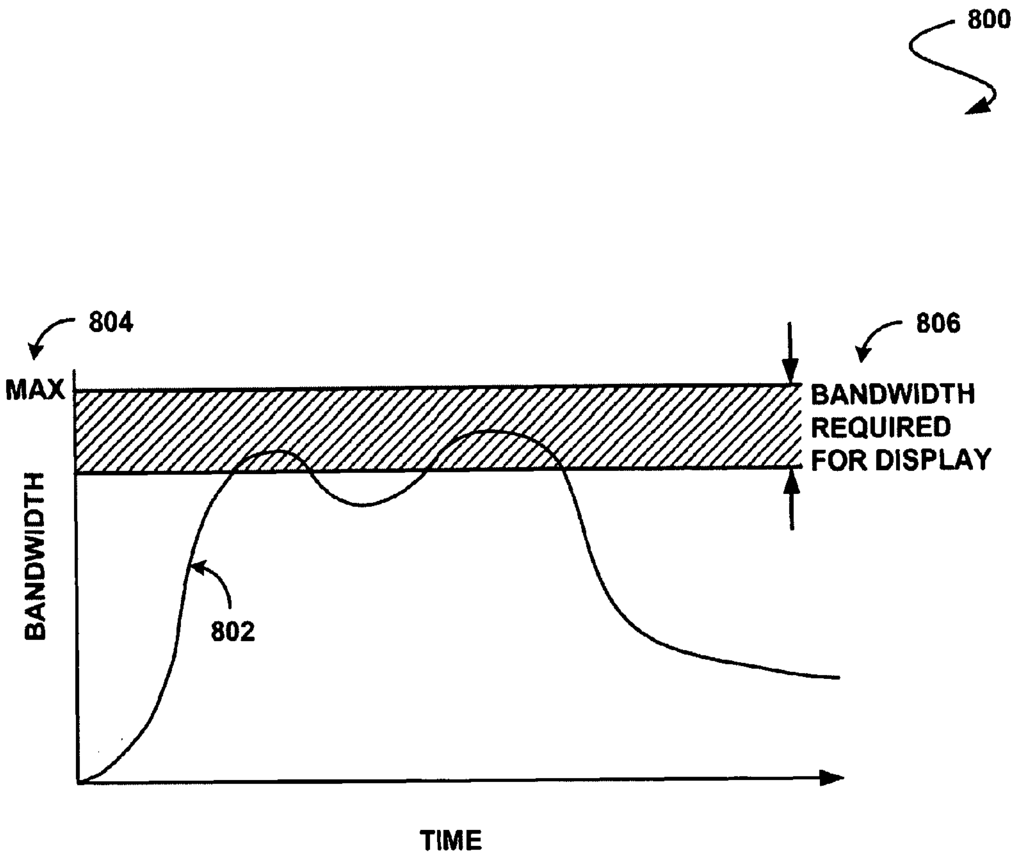
FIG. 8 is a graph showing bandwidth over time in accordance with one embodiment.

FIG. 8 is a graph 800 showing bandwidth 802 over time, in accordance with one embodiment. As shown, a maximum threshold 804 may reflect a total available bandwidth available to all system components including a graphics sub-system. Further shown is a portion of bandwidth 806 that is required by the graphics sub-system for an optimal refresh rate. In situations where current bandwidth usage is approaching the maximum threshold 804, the portion of bandwidth 806 may be reduced (by reducing a refresh rate), thus freeing up bandwidth resources for other system components, etc.

Figure 9:
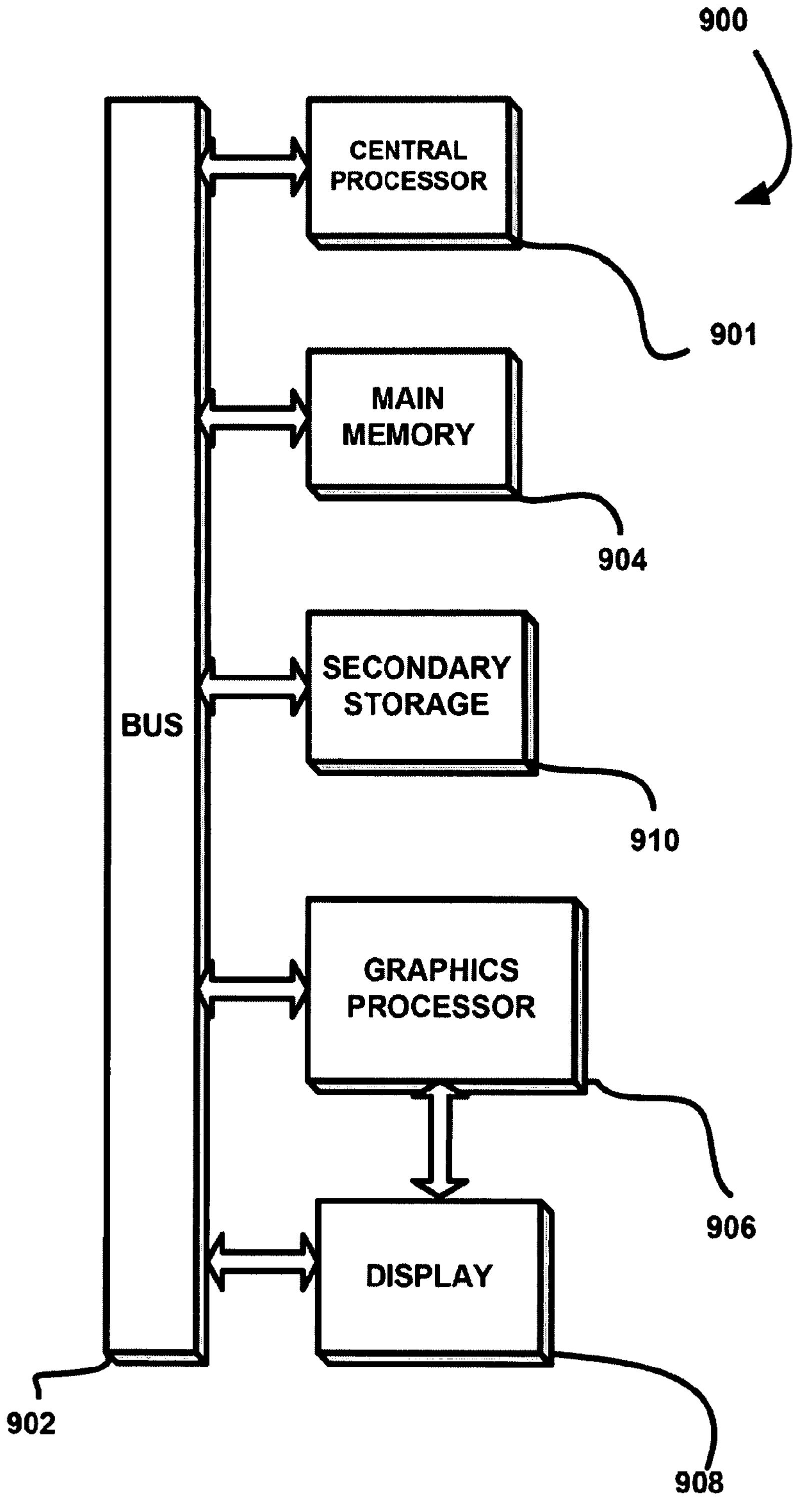
FIG. 9 illustrates an exemplary system in which the various architecture and/or functionality of the previous embodiments may be implemented.

FIG. 9 illustrates an exemplary system 900 in which the various architecture and/or functionality of the previous embodiments may be implemented. As shown, a system 900 is provided including at least one host processor 901 which is connected to a communication bus 902. The system 900 also includes a main memory 904. Control logic (software) and data are stored in the main memory 904 which may take the form of random access memory (RAM).

The system 900 also includes a graphics processor 906 and a display 908, i.e. a computer monitor. In one embodiment, the graphics processor 906 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 900 may also include a secondary storage 910. The secondary storage 910 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 904 and/or the secondary storage 910. Such computer programs, when executed, enable the system 900 to perform various functions. Memory 904, storage 910 and/or any other storage are possible examples of computer-readable media.

In one embodiment, the architecture and/or functionality of the various previous figures may be implemented in the context of the host processor 901, graphics processor 906, an integrated circuit (not shown) that is capable of at least a portion of the capabilities of both the host processor 901 and the graphics processor 906, a chipset (i.e. a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 900 may take the form of a desktop computer, lap-top computer, and/or any other type of logic. Still yet, the system 900 may take the form of various other devices m including, but not limited to a personal digital assistant (PDA) device, a mobile phone device, a television, etc.

Further, while not shown, the system 900 may be coupled to a network [e.g. a telecommunications network, local area network (LAN), wireless network, wide area network (WAN) such as the Internet, peer-to-peer network, cable network, etc.) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:

identifying an aspect of hardware of a display system including an indication of use of which of a plurality of hardware components of a hardware graphics processor is being used, the hardware components of the hardware graphics processor including a first hardware component of the hardware graphics processor and a second hardware component of the hardware graphics processor; and changing a refresh rate of the display system based on the identified aspect including the indication of use of which of the plurality of hardware components of the hardware graphics processor is being used, the hardware components of the hardware graphics processor including the first hardware component of the hardware graphics processor and the second hardware component of the hardware a graphics processor, such that:

the refresh rate of the display system is changed to a first refresh rate in response to the identified aspect including an indication that the first hardware component of the hardware graphics processor is being used, and the refresh rate of the display system is changed to a second refresh rate in response to the identified aspect including an indication that the second hardware component of the hardware graphics processor is being used.

2. The method of claim 1, wherein the display system includes a display that is refreshed at the refresh rate.

3. The method of claim 1, wherein the refresh rate of the display system is changed by changing an inactive time period.

4. The method of claim 1, wherein the refresh rate of the display system is changed for reducing a power consumed by the display system.

5. The method of claim 1, wherein the refresh rate of the display system is changed for each of a plurality of sequential frames of display data.

6. The method of claim 1, wherein the refresh rate of the display system is changed based on a selected profile.

7. The method of claim 6, wherein the profile is associated with one of the first hardware component of the hardware graphics processor and the second hardware component of the hardware graphics processor.

8. The method of claim 7, wherein a profile associated with the first hardware component of the hardware graphics processor decreases the refresh rate when the first hardware component of the hardware graphics processor is used, and a profile associated with the second hardware component of the hardware graphics processor increases the refresh rate when the second hardware component of the hardware graphics processor is used.

9. A computer program product embodied on a non-transitory computer readable medium, comprising:

computer code for identifying an aspect of hardware of a display system including an indication of use of which of a plurality of hardware components of a hardware graphics processor is being used, the hardware components of the hardware graphics processor including a first hardware component of the hardware graphics processor and a second hardware component of the hardware graphics processor; and computer code for changing a refresh rate of the display system based on the identified aspect including the indication of use of which of the plurality of hardware components of the hardware graphics processor is being used, the hardware components of the hardware graphics processor including the first hardware component of the hardware graphics processor and the second hardware component of the hardware graphics processor, such that:

the refresh rate of the display system is changed to a first refresh rate in response to the identified aspect including an indication that the first hardware component of the hardware graphics processor is being used, and the refresh rate of the display system is changed to a second refresh rate in response to the identified aspect including an indication that the second hardware component of the hardware graphics processor is being used.

10. An apparatus, comprising:

an application program interface for identifying an aspect of hardware of a display system, including an indication of use of which of a plurality of hardware components of a hardware graphics processor is being used, the hardware components of the hardware graphics processor including a first hardware component of the hardware graphics processor and a second hardware component of the hardware graphics processor; and a driver in communication with the application program interface, the driver for changing a refresh rate of the display system based on the identified aspect including the indication of use of which of the plurality of hardware components of the hardware graphics processor is being used, the hardware components of the hardware graphics processor including the first hardware component of the hardware graphics processor and the second hardware component of the hardware graphics processor, such that:

the refresh rate of the display system is changed to a first refresh rate in response to the identified aspect including an indication that the first hardware component of the hardware graphics processor is being used, and the refresh rate of the display system is changed to a second refresh rate in response to the identified aspect including an indication that the second hardware component of the hardware graphics processor is being used.

11. The apparatus of claim 10, wherein the display system includes a processor in communication with memory and a display via a bus.

12. The apparatus of claim 10, wherein the application program interface monitors the plurality of hardware components of the hardware graphics processor, including the first hardware component of the hardware graphics processor and the second hardware component of the hardware graphics processor to identify the aspect including the indication of use of which of the plurality of hardware components of the hardware graphics processor is being used, and the application program interface directs the driver to change the refresh rate of the display system based on the identified aspect, resulting from the monitoring, including the indication of use of which of the plurality of hardware components of the hardware graphics processor is being used.

* * * * *

UNITED STATES PATENT AND TRADEMARK OFFICE

CERTIFICATE OF CORRECTION

PATENT NO. : 8,207,977 B1
APPLICATION NO. : 11/867418
DATED : June 26, 2012
INVENTOR(S) : Kumar et al.

It is certified that error appears in the above-identified patent and that said Letters Patent is hereby corrected as shown below:

In the claims:

Claim 1, col. 8, line 56; please remove “a”.

Signed and Sealed this
Sixteenth Day of October, 2012

David J. Kappos
*Director of the United States Patent and Trademark Office*